(12) United States Patent
Huang et al.

(10) Patent No.: US 11,664,868 B2
(45) Date of Patent: May 30, 2023

(54) TRIGGERING APERIODIC CHANNEL STATE INFORMATION (A-CSI) REPORTS ON A PHYSICAL UPLINK CONTROL CHANNEL (PUCCH)

(71) Applicant: QUALCOMM Incorporated, San Diego, CA (US)

(72) Inventors: Yi Huang, San Diego, CA (US); Wei Yang, San Diego, CA (US); Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/225,617

(22) Filed: Apr. 8, 2021

(65) Prior Publication Data

US 2021/0320701 A1   Oct. 14, 2021

Related U.S. Application Data

(60) Provisional application No. 63/007,783, filed on Apr. 9, 2020.

(51) Int. Cl.
| | |
|---|---|
| *H04W 72/14* | (2009.01) |
| *H04B 7/06* | (2006.01) |
| *H04W 72/12* | (2023.01) |
| *H04L 5/00* | (2006.01) |
| *H04L 1/1812* | (2023.01) |
| *H04L 1/1867* | (2023.01) |
| *H04W 72/0446* | (2023.01) |

(52) U.S. Cl.
CPC ......... *H04B 7/0626* (2013.01); *H04L 1/1819* (2013.01); *H04L 1/1896* (2013.01); *H04L 5/0051* (2013.01); *H04W 72/0446* (2013.01); *H04W 72/1257* (2013.01); *H04W 72/14* (2013.01)

(58) Field of Classification Search
CPC ... H04L 1/1819; H04L 1/1896; H04L 5/0051; H04W 72/0446; H04W 72/1257; H04W 72/14
See application file for complete search history.

(56) References Cited

U.S. PATENT DOCUMENTS

| | | | |
|---|---|---|---|
| 2013/0336273 A1* | 12/2013 | Takeda .................. | H04L 5/0057 370/329 |
| 2016/0183244 A1* | 6/2016 | Papasakellariou ...... | H04L 5/001 370/329 |
| 2017/0331602 A1* | 11/2017 | Hugl ..................... | H04L 5/0057 |

(Continued)

*Primary Examiner* — Fahmida S Chowdhury
(74) *Attorney, Agent, or Firm* — Patterson & Sheridan, L.L.P/Qualcomm Incorporated

(57) ABSTRACT

Aspects of the present disclosure provide apparatus, methods, processing systems, and computer readable mediums for scheduling and triggering aperiodic channel state information (A-CSI) reporting on a physical uplink control channel (PUCCH) using a downlink grant. An example method generally includes receiving, from a network entity, a downlink grant including a trigger to transmit an aperiodic channel state information (A-CSI) report on a physical uplink control channel (PUCCH), generating the A-CSI report, and transmitting the A-CSI report on the PUCCH using timing and resources indicated in the downlink grant.

30 Claims, 9 Drawing Sheets

(56) References Cited

U.S. PATENT DOCUMENTS

| | | | | |
|---|---|---|---|---|
| 2017/0367046 A1* | 12/2017 | Papasakellariou | .... | H04L 5/0053 |
| 2018/0310257 A1* | 10/2018 | Papasakellariou | .... | H04W 52/50 |
| 2019/0222349 A1* | 7/2019 | Gao | ...... | H04L 1/0027 |
| 2019/0305837 A1* | 10/2019 | Onggosanusi | ........ | H04L 5/0057 |
| 2020/0107319 A1* | 4/2020 | Bagheri | ................ | H04L 1/1825 |
| 2020/0205150 A1* | 6/2020 | Cheng | ............... | H04W 72/0413 |
| 2020/0214024 A1* | 7/2020 | Lee | ...... | H04B 7/0626 |
| 2020/0245333 A1* | 7/2020 | Lin | ........................ | H04L 5/10 |
| 2020/0259625 A1* | 8/2020 | Papasakellariou | ... | H04B 7/0456 |
| 2020/0374730 A1* | 11/2020 | Gao | ...... | H04L 5/0057 |
| 2021/0203438 A1* | 7/2021 | Matsumura | ........... | H04L 1/1867 |
| 2021/0282162 A1* | 9/2021 | Takeda | ................ | H04L 5/0048 |

* cited by examiner

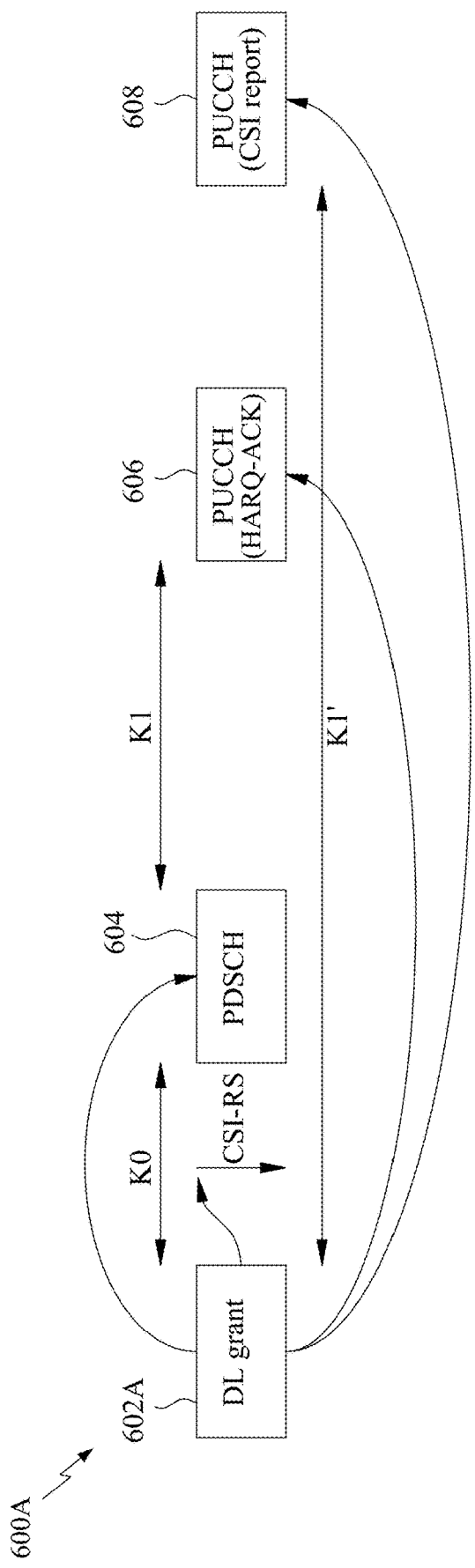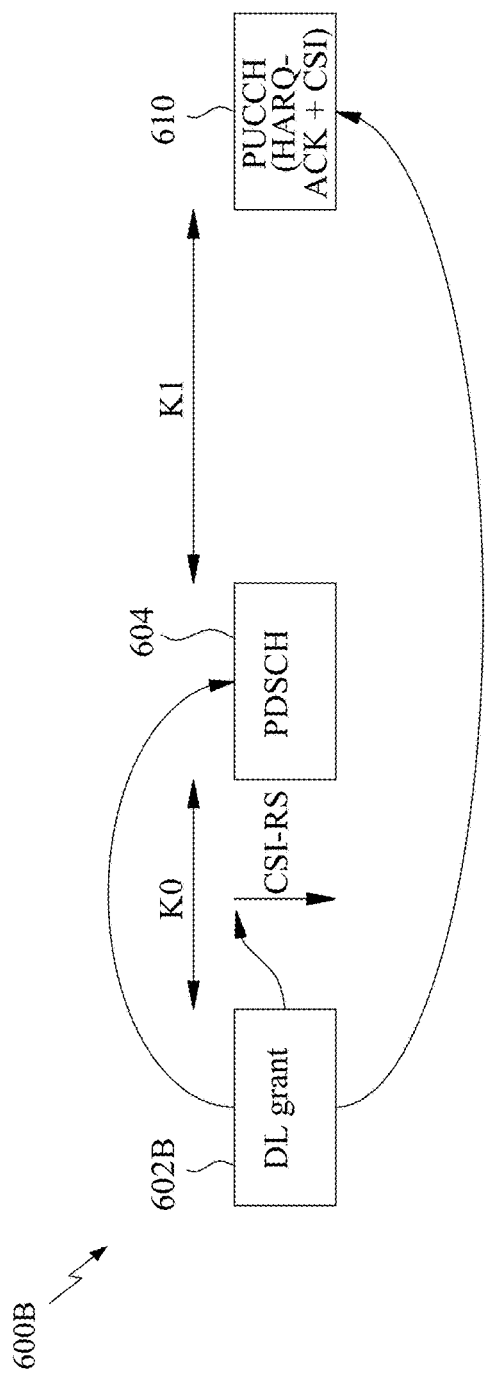
FIG. 6A
FIG. 6B

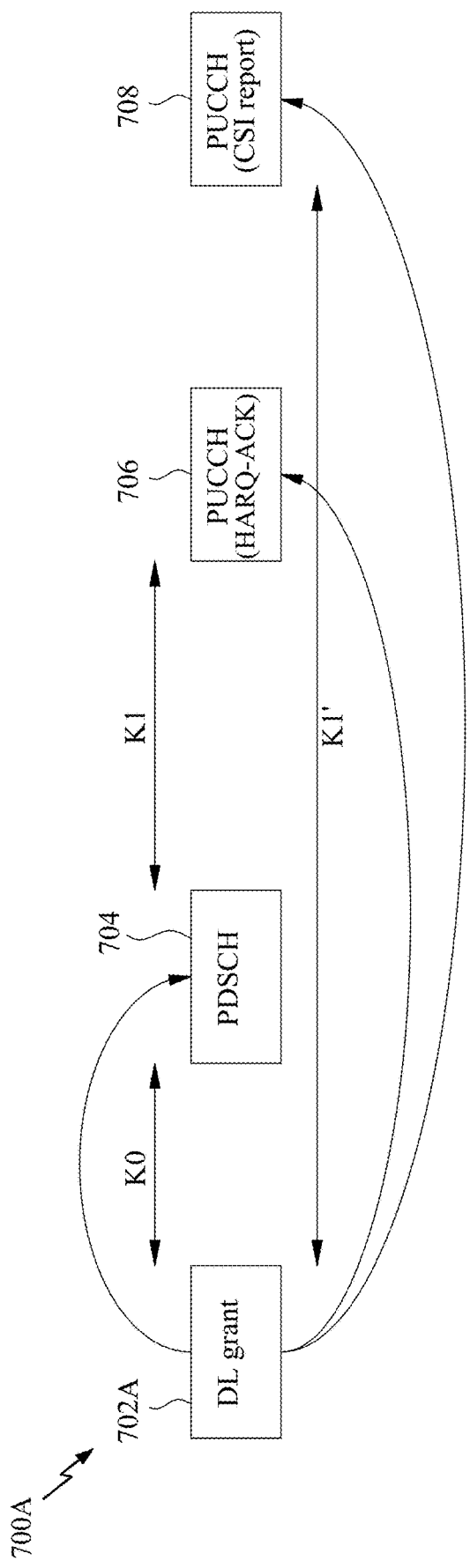
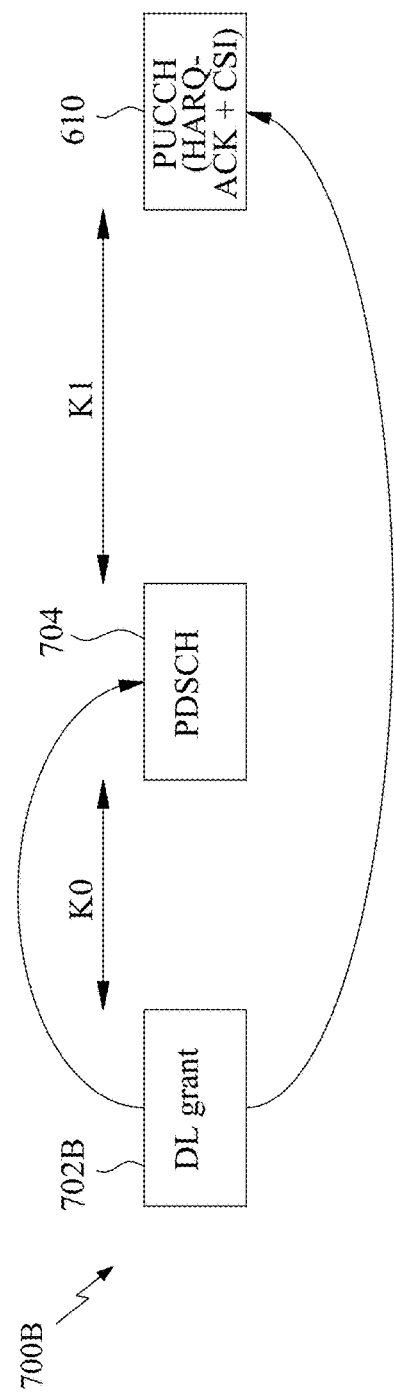
FIG. 7A
FIG. 7B

TRIGGERING APERIODIC CHANNEL STATE INFORMATION (A-CSI) REPORTS ON A PHYSICAL UPLINK CONTROL CHANNEL (PUCCH)

CROSS-REFERENCE TO RELATED APPLICATIONS

This application claims benefit to U.S. Provisional Patent Application Ser. No. 63/007,783, entitled "Triggering Aperiodic Channel State Information (A-CSI) Reports on a Physical Uplink Control Channel (PUCCH)," filed Apr. 9, 2020 and assigned to the assignee hereof, the contents of which are hereby incorporated by reference in its entirety.

TECHNICAL FIELD

Aspects of the present disclosure relate to wireless communications, and more particularly, to techniques for triggering the generation of aperiodic channel state information (A-CSI) reporting on a physical uplink control channel (PUCCH) using a downlink grant.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, further improvements, e.g., improvements in latency, reliability, and the like, in NR and LTE technology remain useful. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

One innovative aspect of the subject matter described in this disclosure can be implemented in a method for wireless communication by a user equipment (UE). The method generally includes receiving, from a network entity, a downlink grant including a trigger to transmit an aperiodic channel state information (A-CSI) report on a physical uplink control channel (PUCCH); generating the A-CSI report; and transmitting the A-CSI report on the PUCCH using timing and resources indicated in the downlink grant.

One innovative aspect of the subject matter described in this disclosure can be implemented in a method for wireless communication by a network entity. The method generally includes transmitting, to a user equipment (UE), a downlink grant including a trigger to transmit an aperiodic channel state information (A-CSI) report on a physical uplink control channel (PUCCH); and receiving the A-CSI report on the PUCCH using timing and resources indicated in the downlink grant.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIGS. 6A and 6B illustrate example timelines for generating aperiodic channel state information (A-CSI) reports based on a channel state information reference signal (CSI-RS), in accordance with some aspects of the present disclosure.

FIGS. 7A and 7B illustrate example timelines for generating aperiodic channel state information (A-CSI) reports based on signaling other than a channel state information reference signal (CSI-RS), in accordance with some aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for scheduling aperiodic channel state information (A-CSI) reporting on a physical uplink control channel (PUCCH).

The following description provides examples of using a downlink grant to schedule A-CSI reporting on a PUCCH, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
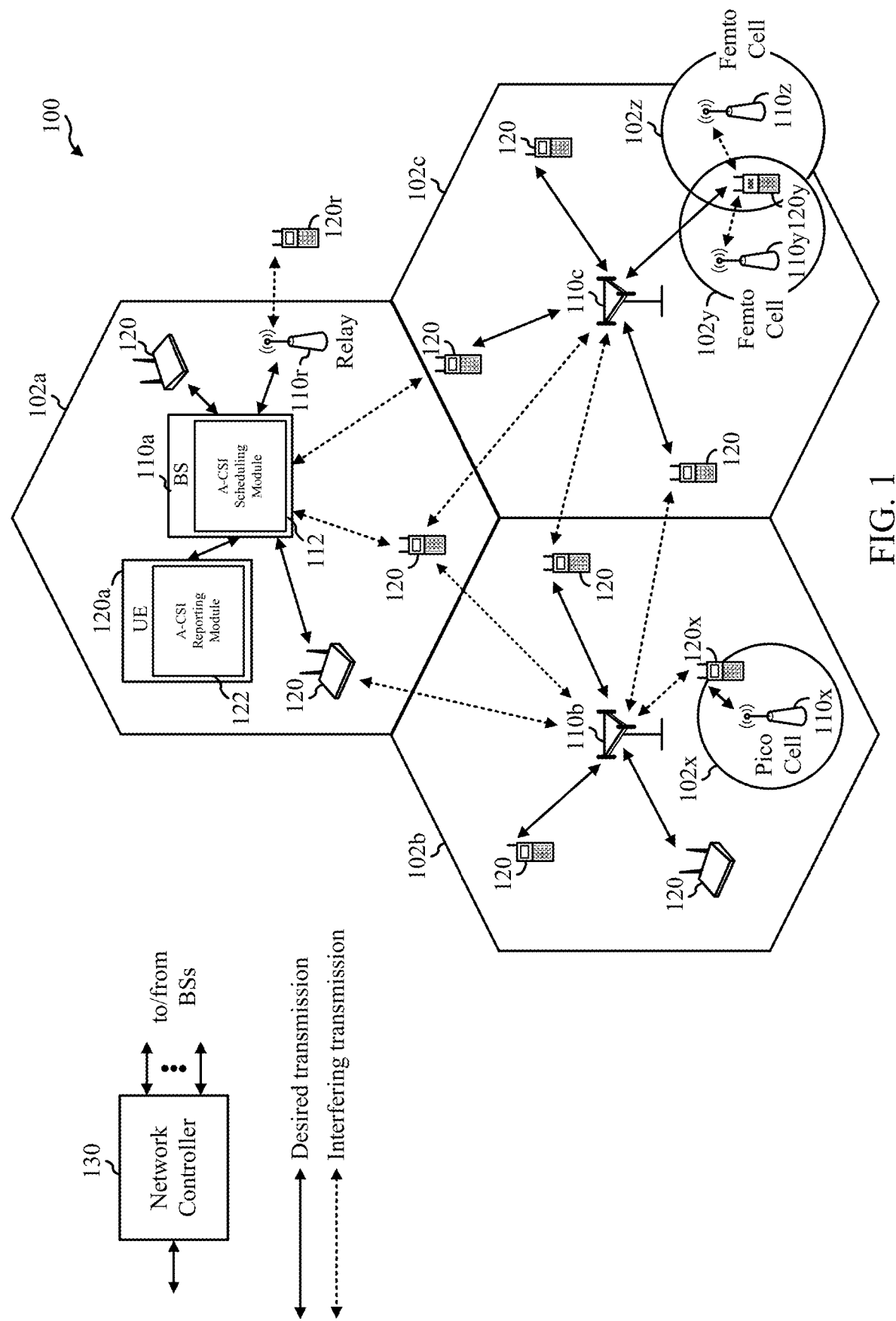
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include an aperiodic channel state information (A-CSI) reporting module 122 that may be configured to perform (or cause UE 120a to perform) operations 400 of FIG. 4.

Figure 5:
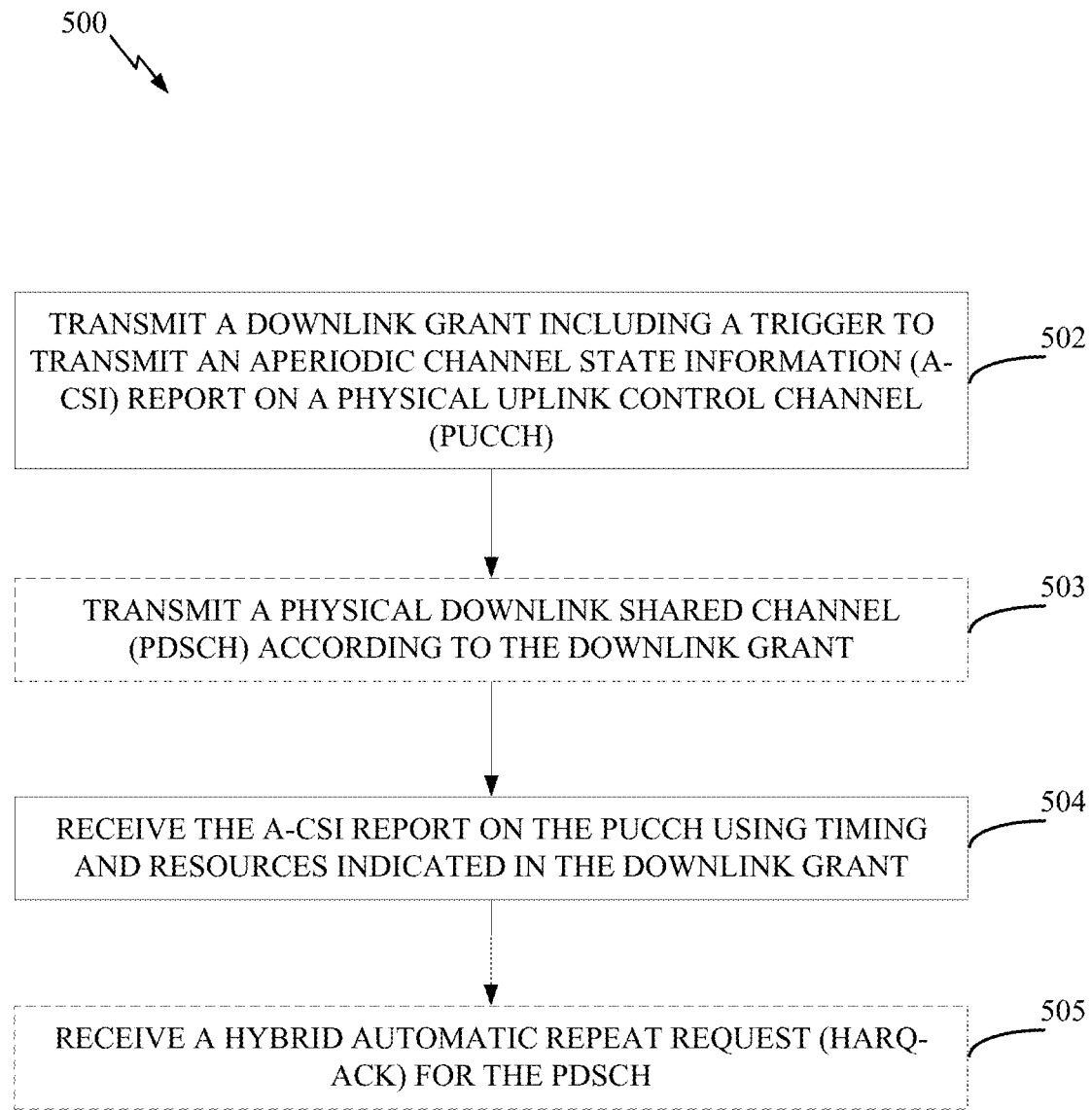
FIG. 5 illustrates example operations for wireless communication by a network entity, in accordance with some aspects of the present disclosure.

Similarly, a base station 110a may include an A-CSI scheduling module 112 that may be configured to perform (or cause the base station 110a to perform) operations 500 of FIG. 5.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
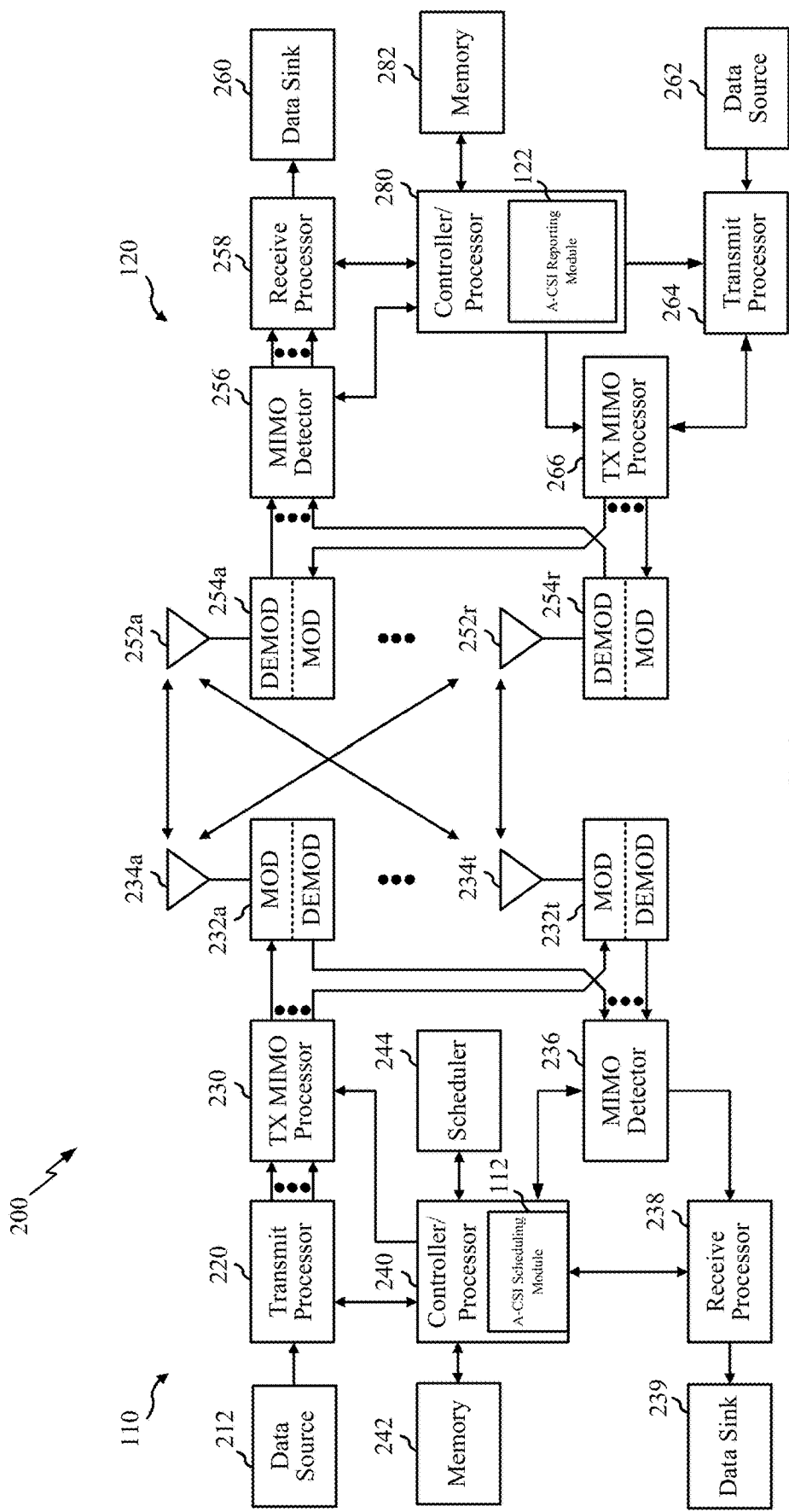
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink. In one example, memory 282 or memory 242 can be a non-transitory computer-readable medium comprising instructions (e.g., instructions that instruct a processor, e.g., controller/processor 680, controller/processor 640, or other processor) to perform any aspects of FIGS. 4 and/or 5. Additionally or alternatively, such instructions may be copied or installed onto memory 282 or memory 242 from a non-transitory computer-readable medium.

The controller/processor 280 or other processors and modules at the UE 120 may perform or direct the execution of processes for the techniques described herein. As shown in FIG. 2, the controller/processor 280 of the UE 120 has an A-CSI Reporting Module 122 that may be configured to perform operations 400 of FIG. 4, as discussed in further detail below. The controller/processor 240 of the base station 110 includes an A-CSI Scheduling Module 112 that may be configured to perform operations 500 of FIG. 5, as discussed in further detail below. Although shown at the Controller/Processor, other components of the UE or BS may be used to perform the operations described herein.

Figure 3:
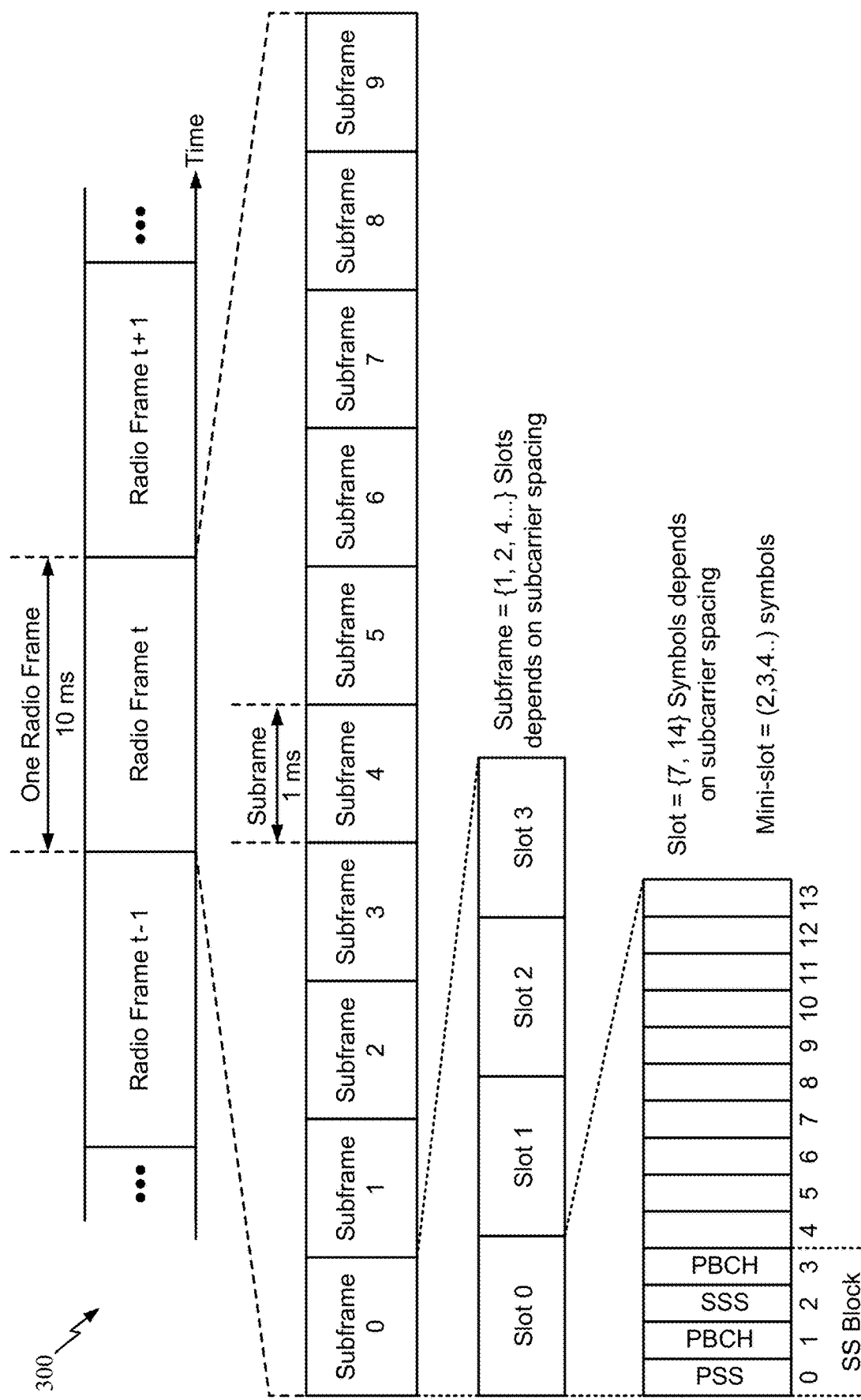
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for Triggering Aperiodic Channel State Information (A-CSI) Reporting on a Physical Uplink Control Channel (PUCCH)

Aspects of the present disclosure provide apparatus, methods, processing systems, and computer readable mediums for triggering aperiodic channel state information (A-CSI) reporting on a physical uplink control channel (PUCCH) using information in a downlink grant.

In some cases, a UE may be triggered to transmit an A-CSI report using an uplink grant. The uplink grant generally is used to schedule a transmission on a physical uplink shared channel (PUSCH). For an A-CSI report, receipt of the uplink grant may thus trigger the UE to measure a CSI reference signal (CSI-RS), schedule the UE to transmit an A-CSI report on the PUSCH, and schedule uplink shared channel (UL-SCH) transmission of a data protocol data unit (PDU) on the PUSCH.

To improve efficiency of A-CSI reporting, aspects of the present disclosure provide for the scheduling of A-CSI reporting using a downlink grant. Generally, a downlink grant may be used to schedule transmissions on the PUCCH. Thus, aspects of the present disclosure allow for A-CSI reporting to be transmitted on a PUCCH, which may leave resources available for other uplink transmissions to be performed on shared channels (e.g., the PUSCH).

Figure 4:
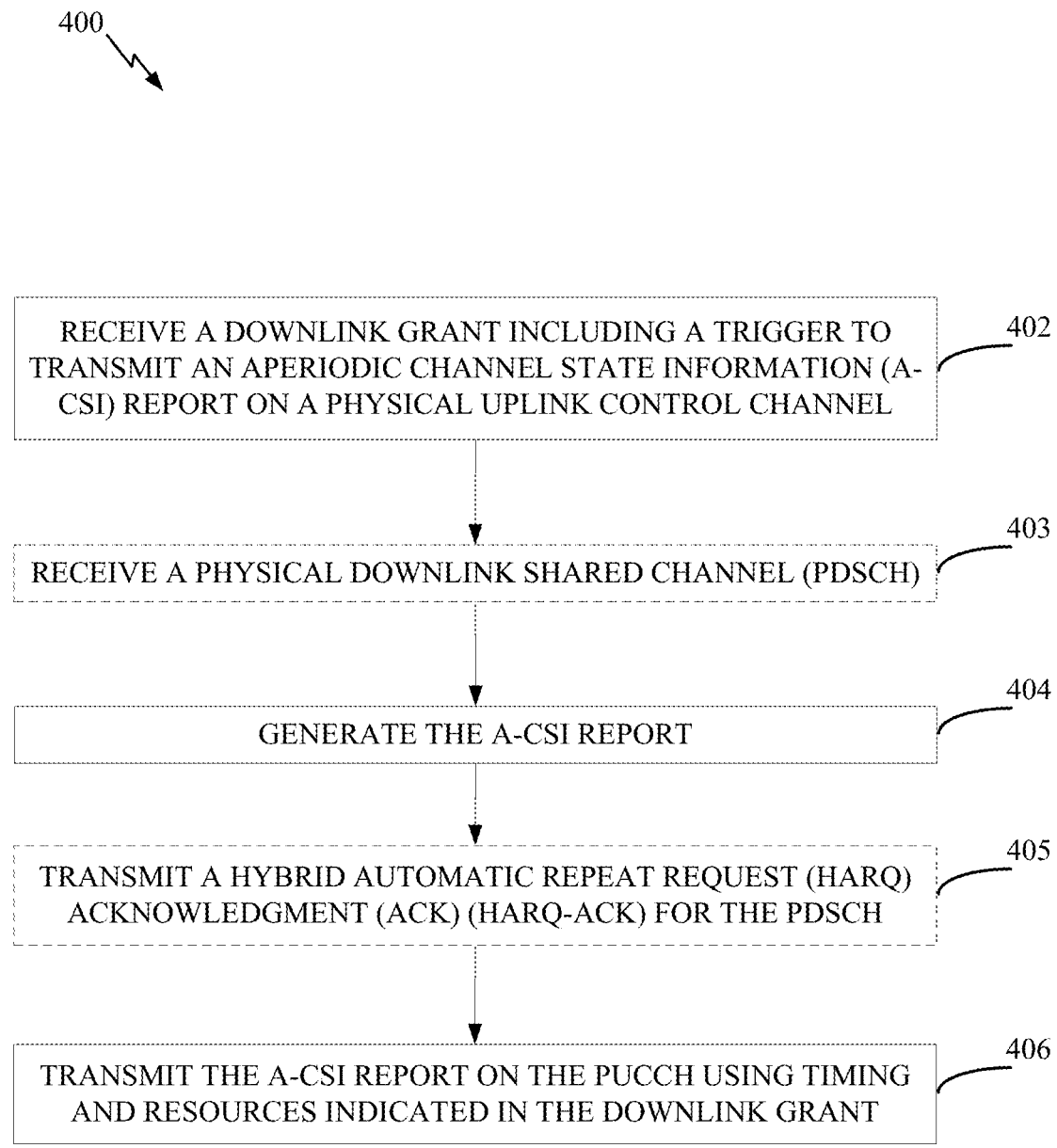
FIG. 4 illustrates example operations for wireless communication by a user equipment (UE), in accordance with some aspects of the present disclosure.

FIG. 4 illustrates example operations 400 that may be performed by a UE to generate and transmit A-CSI reports based on a downlink grant. As illustrated, operations 400 begin at block 402, where the UE receives, from a network entity, a downlink grant including a trigger to transmit an A-CSI report on a PUCCH. Means for performing functionality of block 402 can, but not necessarily, include, for example, antenna(s) 252, DEMOD 254, MIMO detector 256, receive processor 258, controller/processor 280, and/or memory 282, or any combination thereof with reference to FIG. 2.

At block 403, the UE may receive, from the network entity, a physical downlink shared channel (PDSCH) transmission. Means for performing the functionality of block 403 can, but not necessarily, include, for example, antenna(s) 252, DEMOD 254, MIMO detector 256, receive processor 258, controller/processor 280, and/or memory 282, or any combination thereof with reference to FIG. 2.

At block 404, the UE generates the A-CSI report. As discussed in further detail below, the A-CSI report may be generated based on a channel state information reference signal (CSI-RS), a demodulation reference signal, decoding statistics from a downlink shared channel, or other information indicative of channel quality. For example, the A-CSI report can be generated based on a measurement of a CSI-RS or a measurement of a DM-RS, rates at which information on a downlink shared channel is successfully decoded, and so on. Means for performing the functionality of block 404 can, but not necessarily, include, for example, receive processor 258, controller/processor 280, transmit processor 264, and/or memory 282, or any combination thereof with reference to FIG. 2.

At block 405, the UE may transmit, to the network entity, a hybrid automatic repeat request (HARD) acknowledgment (ACK) (HARQ-ACK) for the PDSCH. Means for performing the functionality of block 405 can, but not necessarily, include, for example, Means for performing the functionality of block 406 can, but not necessarily, include, for example, antenna(s) 252, MOD 254, TX MIMO processor 266, transmit processor 264, controller/processor 280, and/or memory 282, or any combination thereof with reference to FIG. 2.

At block 406, the UE transmits the A-CSI report on the PUCCH using timing and resources indicated in the downlink grant. Means for performing the functionality of block 406 can, but not necessarily, include, for example, antenna(s) 252, MOD 254, TX MIMO processor 266, transmit processor 264, controller/processor 280, and/or memory 282, or any combination thereof with reference to FIG. 2.

FIG. 5 illustrates example operations 500 that may be performed by a network entity to trigger a UE to perform A-CSI reporting based on a downlink grant. As illustrated, operations 500 begin at block 502, where a network entity transmits, to a UE, a downlink grant including a trigger to transmit an A-CSI report on a PUCCH. Means for performing the functionality of block 502 can, but not necessarily, include, for example, antenna(s) 234, MOD 232, TX MIMO processor 230, transmit processor 220, controller/processor 240, and/or memory 242, or any combination thereof with reference to FIG. 2.

At block 503, the network entity may transmit, to the UE, a physical downlink shared channel (PDSCH) according to the downlink grant. Means for performing the functionality of block 503 can, but not necessarily, include, for example, antenna(s) 234, MOD 232, TX MIMO processor 230, transmit processor 220, controller/processor 240, and/or memory 242, or any combination thereof with reference to FIG. 2. The transmission of the PDSCH at block 503 may be indicated in the downlink grant, which may trigger the UE to receive the PDSCH at block 403 discussed above with reference to FIG. 4.

At block 504, the network entity receives, from the UE, the A-CSI report on the PUCCH using timing and resources indicated in the downlink grant. Means for performing the functionality of block 504 can, but not necessarily, include, for example, antenna(s) 234, DEMOD 232, MIMO detector 236, receive processor 238, controller/processor 240, and/or memory 242, or any combination thereof with reference to FIG. 2.

At block 505, the network entity may receive, from the UE, a hybrid automatic repeat request (HARQ) acknowledgment (ACK) (HARQ-ACK) for the PDSCH. Means for performing the functionality of block 505 can, but not necessarily, include, for example, antenna(s) 234, DEMOD 232, MIMO detector 236, receive processor 238, controller/processor 240, and/or memory 242, or any combination thereof with reference to FIG. 2.

In some embodiments, the A-CSI report may be generated based on a CSI-RS transmitted by the network entity. In such a case, the downlink grant may trigger or schedule a UE to measure a CSI-RS, receive transmissions on a PDSCH, transmit a hybrid automatic repeat request (HARQ) acknowledgment (ACK) for the PDSCH transmission on a PUCCH, and transmit the A-CSI report on the PUCCH. That is, responsive to the downlink grant, the UE may measure a CSI-RS, receive transmissions on a PDSCH, transmit a HARQ-ACK for the PDSCH transmission, and transmit the A-CSI report on the PUCCH according to timing information included in the downlink grant. The A-CSI report may include, for example, one or more of information about the measured CSI-RS, decoding statistics for the received transmissions on the PDSCH, and/or other information that is indicative of channel quality.

FIG. 6A illustrates an example timeline 600A in which a UE transmits the A-CSI report and HARQ-ACK in different resources and in which the A-CSI report is generated based on a CSI-RS received from a network entity. As illustrated, a UE receives a downlink grant 602. The downlink grant 602A generally includes an indication (e.g., an explicit indication) of a PUCCH resource for transmitting the A-CSI report and an offset from the downlink grant slot to the slot to be used in transmitting the A-CSI report. At some point after receiving the downlink grant, the UE receives a CSI-RS and measures the received CSI to generate an A-CSI report. After a time period K0 has elapsed from receipt of the downlink grant, the UE receives a data transmission on the PDSCH 604. After a time period K1 from the slot(s) on which the data transmission on the PDSCH 604 is received, the UE transmits a HARQ-ACK 606 on PUCCH using resources identified in the downlink grant 602 for transmitting the HARQ-ACK. Additionally, after a period K1' from the downlink grant, the UE transmits the A-CSI report 608 on the PUCCH resource for the A-CSI report identified in the downlink grant. The PUCCH resource used for transmitting the HARQ-ACK 606 may be different from the PUCCH resource used for transmitting the A-CSI report 608.

FIG. 6B illustrates an example timeline 600B in which a UE transmits the A-CSI report and HARQ-ACK on a same resource and in which the A-CSI report is generated based on a CSI-RS received from a network entity. As illustrated, the UE receives a downlink grant 602. The downlink grant 602B generally includes an indication that an A-CSI report and HARQ-ACK are to be transmitted on the same PUCCH resource. This PUCCH resource may be the PUCCH resource indicated in the downlink grant for transmission of the HARQ-ACK. At some point after receiving the downlink grant, the UE receives a CSI-RS from the network entity and generates the A-CSI report based on the received CSI-RS. After a time period K0 has elapsed from receipt of the downlink grant, the UE receives a data transmission on the PDSCH 604. After a time period K1 has elapsed from receipt of the data transmission on the PDSCH, the UE transmits both the A-CSI report and the HARQ-ACK 610 (e.g., an aggregated A-CSI report and HARQ-ACK) on a same PUCCH resource (e.g. the PUCCH resource indicated in the downlink grant for transmission of a HARQ-ACK).

In some embodiments, the A-CSI report may be generated based on information other than a CSI-RS transmitted by the network entity. For example, the UE may generate an A-CSI report based on measuring a demodulation reference signal (DMRS) in a PDSCH transmission, current PDSCH decoding statistics such as a log likelihood ratio (LLR) or signal to interference-plus-noise ratio (SINR), and/or previous PDSCH decoding statistics. In such a case, the downlink grant may trigger or schedule a UE to receive transmissions on a PDSCH, transmit a hybrid automatic repeat request (HARD) acknowledgment (ACK) for the PDSCH transmission on a PUCCH, and transmit the A-CSI report on the PUCCH. That is, responsive to the downlink grant, the UE may receive transmissions on a PDSCH, transmit a HARQ-ACK for the PDSCH transmission, and transmit the A-CSI report generated based on information other than a CSI-RS (e.g., a DMRS, current and/or previous decoding statistics, and the like) on the PUCCH according to timing information included in the downlink grant.

FIG. 7A illustrates an example timeline 700A in which a UE transmits the A-CSI report and HARQ-ACK in different resources and in which the A-CSI report is generated based on information other than a CSI-RS transmitted by a network entity. As illustrated, a UE receives a downlink grant 702A including an indication of a PUCCH resource for the A-CSI report and an offset from the downlink grant slot to the slot to be used in transmitting the A-CSI report. After a time period K0 has elapsed from receipt of the downlink grant, the UE receives a data transmission 704 on the PDSCH. The UE generates the A-CSI report based on the data transmission on the PDSCH (e.g., based on measuring a DMRS received on the PDSCH, current PDSCH decoding statistics, and/or previous PDSCH decoding statistics). After a time period K1 from the slot(s) on which the data transmission on the PDSCH is received, the UE transmits a HARQ-ACK 706 on PUCCH using resources identified in the downlink grant for transmitting the HARQ-ACK. Additionally, after a period K1' from the downlink grant, the UE transmits the A-CSI report 708 on the PUCCH resource for the A-CSI report identified in the downlink grant. The PUCCH resource used for transmitting the HARQ-ACK may be different from the PUCCH resource used for transmitting the A-CSI report.

FIG. 7B illustrates an example timeline 700B in which a UE transmits the A-CSI report and HARQ-ACK on a same resource and in which the A-CSI report is generated based on a CSI-RS received from a network entity. As illustrated, the UE receives a downlink grant 702B including an indication that an A-CSI report and HARQ-ACK are to be transmitted on the same PUCCH resource. This PUCCH resource may be the PUCCH resource indicated in the downlink grant for transmission of the HARQ-ACK. After a time period K0 has elapsed from receipt of the downlink grant, the UE receives a data transmission 704 on the PDSCH. The UE generates the A-CSI report based on the data transmission on the PDSCH (e.g., based on measuring a DMRS received on the PDSCH, current PDSCH decoding statistics, and/or previous PDSCH decoding statistics). After a time period K1 has elapsed from receipt of the data transmission on the PDSCH, the UE transmits both the A-CSI report and the HARQ-ACK 710 (e.g., an aggregated A-CSI report and HARQ-ACK) on a same PUCCH resource (e.g. the PUCCH resource indicated in the downlink grant for transmission of a HARQ-ACK).

In some embodiments, a UE may switch between a first mode in which the A-CSI report is generated based on a CSI-RS and a second mode in which the A-CSI report is generated based on information other than a CSI-RS (e.g., a DMRS, current and/or previous PDSCH decoding statistics, etc.). The presence or absence of a field (e.g., a mode switching field) in the downlink grant may be used to implicitly signal whether a UE is to generate the A-CSI report based on a CSI-RS or information other than a CSI-RS. For example, the presence or absence of the CSI request field in a downlink grant may implicitly signal whether a UE is to generate the A-CSI report based on a CSI-RS or information other than a CSI-RS. If the CSI request field is present, the UE may generate the A-CSI report based on a CSI-RS received from a network entity. If, however, the CSI request field is not present, the UE may generate the A-CSI report based on information other than a CSI-RS (e.g., a DMRS, current and/or previous PDSCH decoding statistics, etc.).

Explicit signaling may be used to indicate whether a UE is to generate the A-CSI report based on a CSI-RS or information other than a CSI-RS. The explicit signaling may be carried in a bit in the downlink grant. A first value may explicitly signal that a UE is to generate the A-CSI report based on a CSI-RS received from a network entity, and a second value may explicitly signal that the UE is to generate the A-CSI report based on information other than a CSI-RS.

In some embodiments, a UE may switch between transmitting HARQ-ACK and the A-CSI report separately or on a same PUCCH resource. The presence or absence of fields in the downlink grant may indicate whether the HARQ-ACK and the A-CSI report are to be transmitted separately or on a same PUCCH resource. For example, where a resource field and a slot offset indication field for the A-CSI report exists in the downlink grant, the UE can determine that different resources are to be used for transmitting the HARQ-ACK and the A-CSI report. Otherwise, where the resource field and the slot offset indication field for the A-CSI report is absent, the UE can determine that the HARQ-ACK and the A-CSI report are to be transmitted on the same PUCCH resources.

Explicit signaling may be used to indicate whether a UE is to transmit the HARQ-ACK and the A-CSI report separately or on a same PUCCH resource. For example, a bit in the downlink grant may explicitly signal whether the UE is to transmit the HARQ-ACK and the A-CSI report separately or on a same PUCCH resource. A first value of the bit may indicate that the HARQ-ACK and the A-CSI report are to be transmitted separately, while a second value of the bit may indicate that the HARQ-ACK and the A-CSI report are to be transmitted on the same PUCCH resource.

Figure 8:
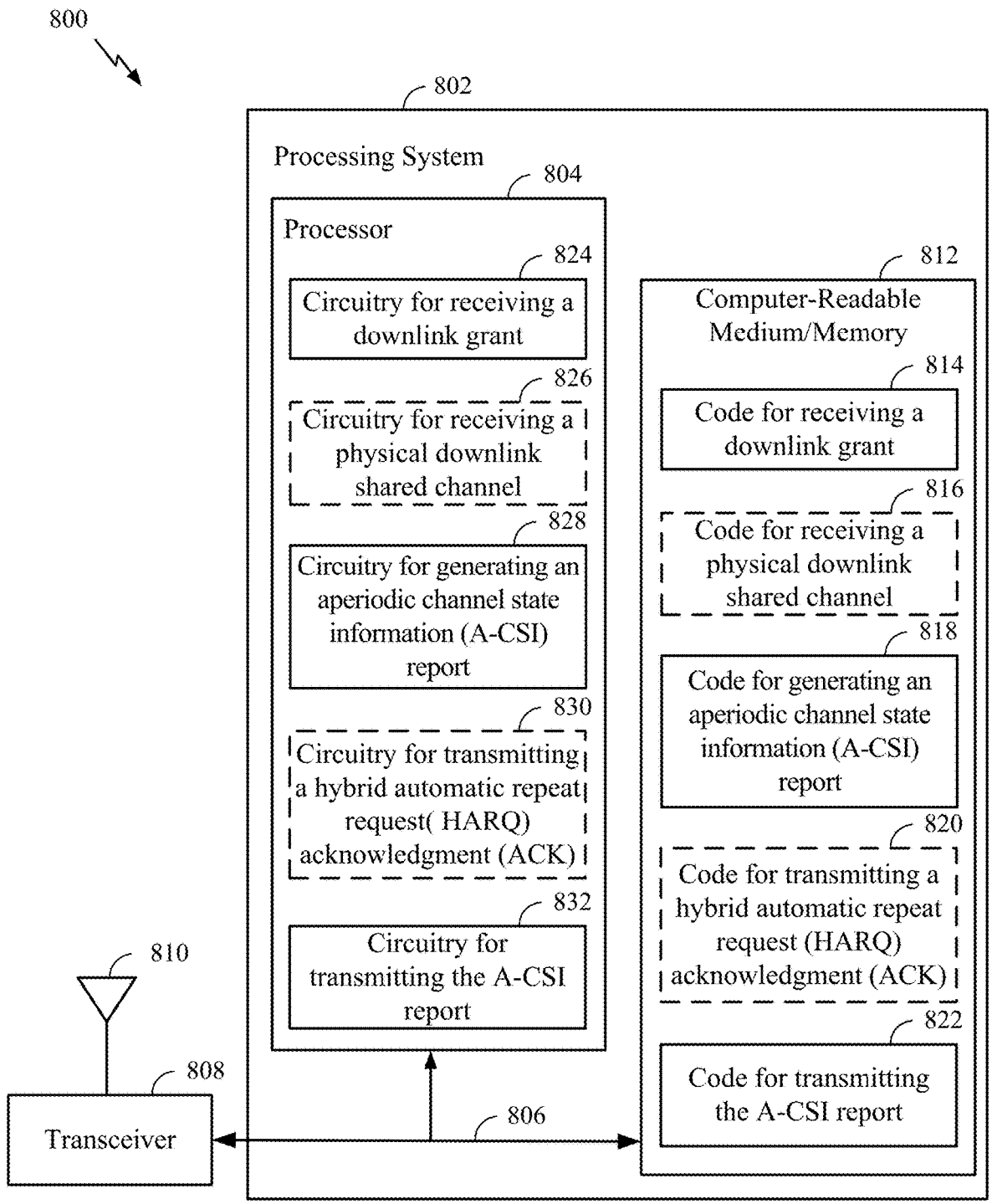
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 4. The communications device 800 includes a processing system 802 coupled to a transceiver 808. Processing system 802 may correspond to controller/processor 280 illustrated in FIG. 2. Transceiver 808 may correspond to transceivers 254a-254r illustrated in FIG. 2. The transceiver 808 is configured to transmit and receive signals for the communications device 800 via an antenna 810, such as the various signals as described herein. Antenna 810 may correspond to antennas 252a-252r illustrated in FIG. 2. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 4, or other operations for performing the various techniques discussed herein for A-CSI reporting based on a downlink grant. In certain aspects, computer-readable medium/memory 812 stores code 814 for receiving a downlink grant; (optionally) code 816 for receiving a physical downlink shared channel; code 818 for generating an aperiodic channel state information (A-CSI) report; (optionally) code 820 for transmitting a hybrid automatic repeat request (HARQ) acknowledgment (ACK); and code 822 for transmitting the A-CSI report. The processor 804 includes circuitry 824 for receiving a downlink grant; (optionally) circuitry 826 for receiving a physical downlink shared channel; circuitry 828 for generating an aperiodic channel state information (A-CSI) report; (optionally) circuitry 830 for transmitting a hybrid automatic repeat request (HARQ) acknowledgment (ACK); and circuitry 832 for transmitting the A-CSI report.

Figure 9:
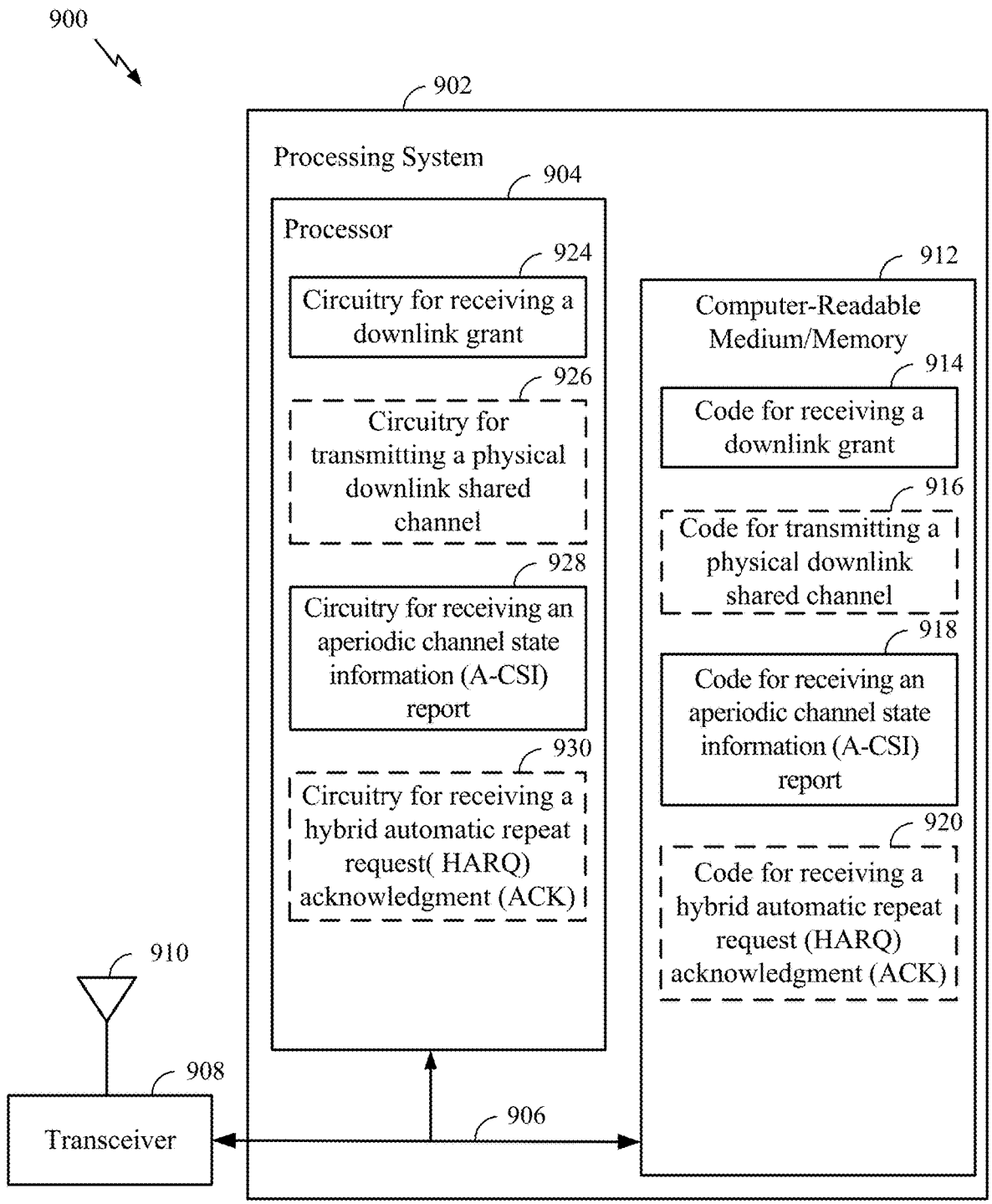
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 5. The communications device 900 includes a processing system 902 coupled to a transceiver 908. Processing system 902 may correspond to controller/processor 240 illustrated in FIG. 2. Transceiver 908 may correspond to transceivers 232a-232r illustrated in FIG. 2. The transceiver 908 is configured to transmit and receive signals for the communications device 900 via an antenna 910, such as the various signals as described herein. Antenna 910 may correspond to antennas 234a-234r illustrated in FIG. 2. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 5, or other operations for performing the various techniques discussed herein for A-CSI reporting based on a downlink grant. In certain aspects, computer-readable medium/memory 912 stores code 914 for receiving a downlink grant; (optionally) code 916 for transmitting a physical downlink shared channel; code 918 for receiving an aperiodic channel state information (A-CSI) report; and (optionally) code 920 for receiving a hybrid automatic repeat request (HARQ) acknowledgment (ACK). The processor 904 includes circuitry 924 for receiving a downlink grant; (optionally) circuitry 926 for transmitting a physical downlink shared channel; circuitry 928 for receiving an aperiodic channel state information (A-CSI) report; and (optionally) circuitry 930 for receiving a hybrid automatic repeat request (HARQ) acknowledgment (ACK).

Example Clauses

Clause 1: A method for wireless communications by a user equipment (UE), comprising: receiving, from a network entity, a downlink grant including a trigger to transmit an aperiodic channel state information (A-CSI) report on a physical uplink control channel (PUCCH); generating the A-CSI report; and transmitting the A-CSI report on the PUCCH using timing and resources indicated in the downlink grant.

Clause 2: The method of Clause 1, further comprising, responsive to receiving the downlink grant: receiving a physical downlink shared channel (PDSCH); and transmitting a hybrid automatic repeat request (HARQ) acknowledgment (ACK) (HARQ-ACK) for the PDSCH.

Clause 3: The method of Clause 2, wherein the HARQ-ACK is transmitted on a different PUCCH resource than the A-CSI report.

Clause 4: The method of Clause 2, wherein the HARQ-ACK is aggregated with the generated A-CSI report for transmission on the PUCCH.

Clause 5: The method of any of Clauses 1 through 4, wherein the downlink grant indicates information from which the A-CSI report is to be generated.

Clause 6: The method of Clause 5, wherein the information from which the A-CSI report is to be generated comprises a channel state information (CSI) reference signal (RS).

Clause 7: The method of Clause 5, wherein the information from which the A-CSI report is to be generated comprises a demodulation reference signal (DMRS), physical downlink shared channel (PDSCH) decoding statistics, or both.

Clause 8: The method of any of Clauses 1 through 7, wherein the information from which the A-CSI report is to be generated is identified by presence or absence of a CSI request field in the downlink grant.

Clause 9: The method of any of Clauses 1 through 7, wherein the information from which the A-CSI report is to be generated is identified by a value of a mode switching field in the downlink grant.

Clause 10: The method of any of Clauses 1 through 9, wherein an indication that a hybrid automatic repeat request (HARQ) acknowledgment (ACK) (HARQ-ACK) and the A-CSI report are to be transmitted on different resources comprises a presence of a resource field and a slot offset indication field in the downlink grant.

Clause 11: The method of any of Clauses 1 through 9, wherein an indication that a hybrid automatic repeat request (HARQ) acknowledgment (ACK) (HARQ-ACK) and the A-CSI report are to be transmitted on different resources comprises an explicit indication in a field in the downlink grant.

Clause 12: A method for wireless communications by a network entity, comprising: transmitting, to a user equipment (UE), a downlink grant including a trigger to transmit an aperiodic channel state information (A-CSI) report on a physical uplink control channel (PUCCH); and receiving, from the UE, the A-CSI report on the PUCCH using timing and resources indicated in the downlink grant.

Clause 13: The method of Clause 12, further comprising: transmitting, to the UE, a physical downlink shared channel (PDSCH) according to the downlink grant; and receiving, from the UE, a hybrid automatic repeat request (HARD) acknowledgment (ACK) (HARQ-ACK) for the PDSCH.

Clause 14: The method of Clause 13, wherein the HARQ-ACK is received on a different PUCCH resource than the A-CSI report.

Clause 15: The method of Clause 13, wherein the HARQ-ACK is aggregated with the received A-CSI report.

Clause 16: The method of any of Clauses 12 through 15, wherein the downlink grant indicates information from which the A-CSI report is to be generated.

Clause 17: The method of Clause 16, wherein the information from which the A-CSI report is to be generated comprises a channel state information (CSI) reference signal (RS).

Clause 18: The method of Clause 16, wherein the information from which the A-CSI report is to be generated comprises a demodulation reference signal (DMRS), physical downlink shared channel (PDSCH) decoding statistics, or both.

Clause 19: The method of any of Clauses 12 through 18, wherein the information from which the A-CSI report is to be generated is identified by presence or absence of a CSI request field in the downlink grant.

Clause 20: The method of any of Clauses 12 through 18, wherein the information from which the A-CSI report is to be generated is identified by a value of a mode switching field in the downlink grant.

Clause 21: The method of any of Clauses 12 through 20, wherein an indication that a hybrid automatic repeat request (HARQ) acknowledgment (ACK) (HARQ-ACK) and the A-CSI are to be transmitted on different resources comprises a presence of a resource field and a slot offset indication field in the downlink grant.

Clause 22: The method of any of Clauses 12 through 20, wherein an indication that a hybrid automatic repeat request (HARQ) acknowledgment (ACK) (HARQ-ACK) and the A-CSI are to be transmitted on different resources comprises an explicit indication in a field in the downlink grant.

Clause 23: An apparatus, comprising: a memory; and a processor configured to perform the operations of any of Clauses 1 through 11.

Clause 24: An apparatus, comprising: a memory, and a processor configured to perform the operations of any of Clauses 12 through 22.

Clause 25: An apparatus, comprising: means for performing the operations of any of Clauses 1 through 11.

Clause 26: An apparatus, comprising: means for performing the operations of any of Clauses 12 through 22.

Clause 27: A computer-readable medium having instructions stored thereon which, when executed by a processor, performs the operations of any of Clauses 1 through 11.

Clause 28: A computer-readable medium having instructions stored thereon which, when executed by a processor, performs the operations of any of Clauses 12 through 22.

ADDITIONAL CONSIDERATIONS

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using time division duplexing (TDD). In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
receiving, from a network entity, a downlink grant including a trigger to transmit an aperiodic channel state information (A-CSI) report on a physical uplink control channel (PUCCH);
generating the A-CSI report; and
transmitting the A-CSI report on the PUCCH using timing and resources indicated in the downlink grant.

2. The method of claim 1, further comprising, responsive to receiving the downlink grant:
receiving a physical downlink shared channel (PDSCH); and
transmitting a hybrid automatic repeat request (HARD) acknowledgment (ACK) (HARQ-ACK) for the PDSCH.

3. The method of claim 2, wherein the HARQ-ACK is transmitted on a different PUCCH resource than the A-CSI report.

4. The method of claim 2, wherein the HARQ-ACK is aggregated with the generated A-CSI report for transmission on the PUCCH.

5. The method of claim 1, wherein the downlink grant indicates information from which the A-CSI report is to be generated.

6. The method of claim 5, wherein the information from which the A-CSI report is to be generated comprises a channel state information (CSI) reference signal (RS).

7. The method of claim 5, wherein the information from which the A-CSI report is to be generated comprises a demodulation reference signal (DMRS), physical downlink shared channel (PDSCH) decoding statistics, or both.

8. The method of claim 1, wherein information from which the A-CSI report is to be generated is identified by presence or absence of a CSI request field in the downlink grant.

9. The method of claim 1, wherein information from which the A-CSI report is to be generated is identified by a value of a mode switching field in the downlink grant.

10. The method of claim 1, wherein an indication that a hybrid automatic repeat request (HARQ) acknowledgment (ACK) (HARQ-ACK) and the A-CSI report are to be transmitted on different resources comprises a presence of a resource field and a slot offset indication field in the downlink grant.

11. The method of claim 1, wherein an indication that a hybrid automatic repeat request (HARQ) acknowledgment (ACK) (HARQ-ACK) and the A-CSI report are to be transmitted on different resources comprises an explicit indication in a field in the downlink grant.

12. A method for wireless communications by a network entity, comprising:
transmitting, to a user equipment (UE), a downlink grant including a trigger to transmit an aperiodic channel state information (A-CSI) report on a physical uplink control channel (PUCCH); and
receiving, from the UE, the A-CSI report on the PUCCH using timing and resources indicated in the downlink grant.

13. The method of claim 12, further comprising:
transmitting, to the UE, a physical downlink shared channel (PDSCH) according to the downlink grant; and
receiving, from the UE, a hybrid automatic repeat request (HARQ) acknowledgment (ACK) (HARQ-ACK) for the PDSCH.

14. The method of claim 13, wherein the HARQ-ACK is received on a different PUCCH resource than the A-CSI report.

15. The method of claim 13, wherein the HARQ-ACK is aggregated with the received A-CSI report.

16. The method of claim 12, wherein the downlink grant indicates information from which the A-CSI report is to be generated.

17. The method of claim 16, wherein the information from which the A-CSI report is to be generated comprises a channel state information (CSI) reference signal (RS).

18. The method of claim 16, wherein the information from which the A-CSI report is to be generated comprises a demodulation reference signal (DMRS), physical downlink shared channel (PDSCH) decoding statistics, or both.

19. The method of claim 12, wherein information from which the A-CSI report is to be generated is identified by presence or absence of a CSI request field in the downlink grant.

20. The method of claim 12, wherein information from which the A-CSI report is to be generated is identified by a value of a mode switching field in the downlink grant.

21. The method of claim 12, wherein an indication that a hybrid automatic repeat request (HARQ) acknowledgment (ACK) (HARQ-ACK) and the A-CSI are to be transmitted on different resources comprises a presence of a resource field and a slot offset indication field in the downlink grant.

22. The method of claim 12, wherein an indication that a hybrid automatic repeat request (HARQ) acknowledgment (ACK) (HARQ-ACK) and the A-CSI are to be transmitted on different resources comprises an explicit indication in a field in the downlink grant.

23. An apparatus for wireless communications by a user equipment (UE), comprising:
a memory;
a transceiver; and
a processor, coupled to the memory and the transceiver, configured to:
receive, via the transceiver, from a network entity, a downlink grant including a trigger to transmit an aperiodic channel state information (A-CSI) report on a physical uplink control channel (PUCCH),
generate the A-CSI report, and
transmit, via the transceiver, the A-CSI report on the PUCCH using timing and resources indicated in the downlink grant.

24. The apparatus of claim 23, wherein the processor is further configured to, responsive to receiving the downlink grant:
receive, via the transceiver, a physical downlink shared channel (PDSCH); and
transmit, via the transceiver, a hybrid automatic repeat request (HARQ) acknowledgment (ACK) for the PDSCH.

25. The apparatus of claim 23, wherein the downlink grant indicates information from which the A-CSI report is to be generated, and the information from which the A-CSI report is to be generated comprises a channel state information (CSI) reference signal (RS).

26. The apparatus of claim 23, wherein the downlink grant indicates information from which the A-CSI report is to be generated, and the information from which the A-CSI report is to be generated comprises a demodulation reference signal (DMRS), physical downlink shared channel (PDSCH) decoding statistics, or both.

27. An apparatus for wireless communications by a network entity, comprising:
a memory;
a transceiver; and
a processor configured to:
transmit, via the transceiver, to a user equipment (UE), a downlink grant including a trigger to transmit an aperiodic channel state information (A-CSI) report on a physical uplink control channel (PUCCH), and
receive, via the transceiver, from the UE, the A-CSI report on the PUCCH using timing and resources indicated in the downlink grant.

28. The apparatus of claim 27, wherein the processor is further configured to:
transmit, via the transceiver, to the UE, a physical downlink shared channel (PDSCH) according to the downlink grant; and
receive, via the transceiver, from the UE, a hybrid automatic repeat request (HARD) acknowledgment (ACK) for the PDSCH.

29. The apparatus of claim 27, wherein the downlink grant indicates information from which the A-CSI report is to be generated, and the information from which the A-CSI report is to be generated comprises a channel state information (CSI) reference signal (RS).

30. The apparatus of claim 27, wherein the downlink grant indicates information from which the A-CSI report is to be generated, and the information from which the A-CSI report is to be generated comprises a demodulation reference signal (DMRS), physical downlink shared channel (PDSCH) decoding statistics, or both.

* * * * *